Jan. 19, 1965 F. G. WARRICK 3,166,331
PISTON RING SPACER-EXPANDER WITH OVERLAP INDICATION MEANS
Filed June 25, 1962 2 Sheets-Sheet 1
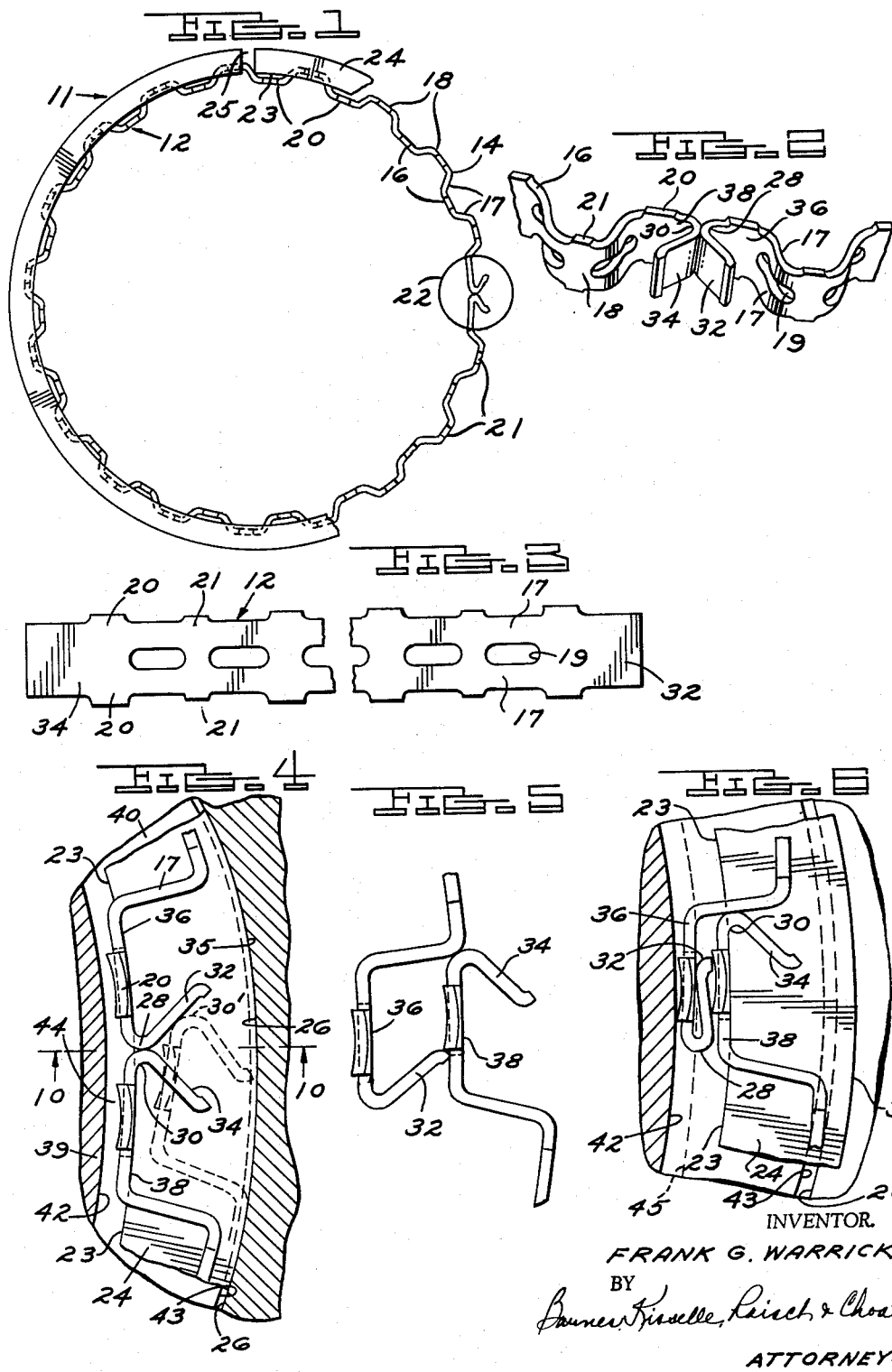
INVENTOR.
FRANK G. WARRICK
BY
ATTORNEYS Jan. 19, 1965  F. G. WARRICK  3,166,331
PISTON RING SPACER-EXPANDER WITH OVERLAP INDICATION MEANS
Filed June 25, 1962  2 Sheets-Sheet 2
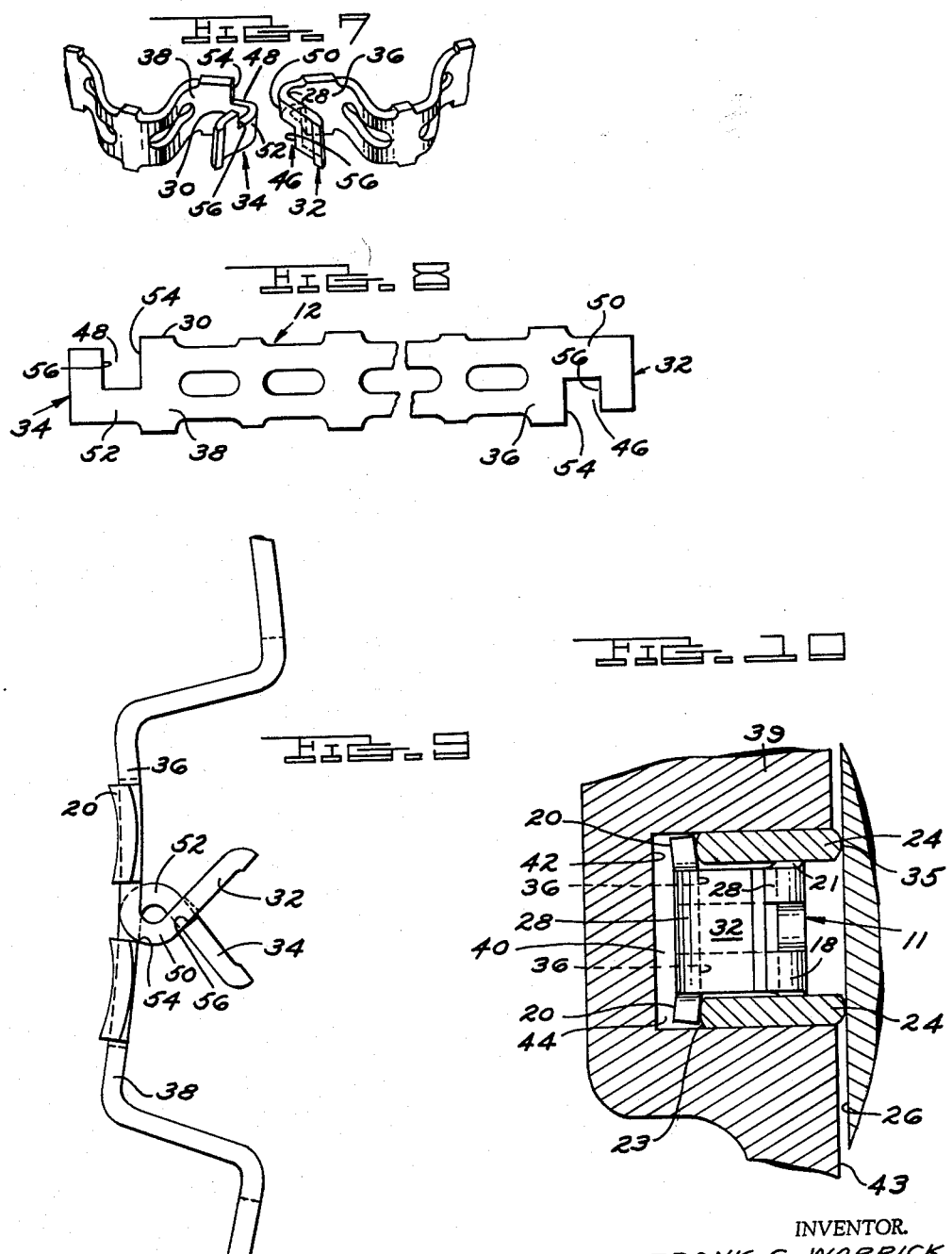
INVENTOR.
FRANK G. WARRICK
BY
Barnes, Kisselle, Raisch & Choate
ATTORNEYS _United States Patent Office_

3,166,331
Patented Jan. 19, 1965

3,166,331
PISTON RING SPACER-EXPANDER WITH
OVERLAP INDICATION MEANS
Frank G. Warrick, Muskegon, Mich., assignor to Sealed
Power Corporation, Muskegon, Mich., a corporation of
Michigan
Filed June 25, 1962, Ser. No. 205,030
21 Claims. (Cl. 277—139)

This invention relates to a spacer-expander of a piston oil ring for an internal combustion engine and in particular to an oil ring of the type having a corrugated, parted spacer-expander which must have its ends aligned to function properly.

In many prior art oil rings a circumferentially compressible spacer-expander is located between upper and lower rails for urging the rails radially outwardly into contact with the bore of the cylinder. Such rings function properly only if the ends of the spacer-expander are abutting when the piston and oil ring assembly is inserted within the cylinder. Such spacer-expanders are self-supporting in that when the spacer-expander ends are abutting and the spacer-expander is compressed circumferentially, it will operate effectively without engaging the bottom of an oil ring groove in the piston. One type of spacer-expander is in the form of a parted ring formed with radially extending corrugations as disclosed in U.S. Letters Patent No. 2,789,872, issued to H. M. Olson on April 23, 1957. However, either prior to or during insertion of the piston within the cylinder, the ends of the spacer-expander may become overlapped inadvertently. With a corrguated spacer-expander of the type disclosed in said Olson patent, if the ends of the spacer-expander become overlapped the overlapping corrugations can nest within one another. In use the oil ring of the aforementioned patent is spaced radially outwardly from the bottom of the oil ring groove. This spacing is sufficient to accommodate the overlapped ends of the spacer-expander and permit the insertion of a piston and oil ring assembly within the cylinder bore even though the spacer-expander ends are overlapped. When overlapping is present the spacer-expander will not urge the oil ring outward against the cylinder bore in the manner intended. Improper cooperation between the cylinder bore and the oil ring assembly may result in excessive oil consumption, smoking and loss of power.

The present invention solves the problems created by overlapped spacer-expander ends in prior art by providing each of the ends with a return bent portion that forms an acute included angle with the contiguous portion of the spacer-expander. By such an arrangement, overlapping of the ends is minimized but if it does occur, the piston and oil ring assembly cannot be inserted within the cylinder bore. When the ends of the spacer-expander of the present invention are slightly misaligned or partially overlapped, the return bent portions will usually cam the ends into alignment when the oil ring is compressed prior to inserting the piston and oil ring assembly within the cylinder. If for some reason the camming action does not occur, as for example, where the ends are overlapped substantially, when the ring is compressed for insertion in the cylinder bore one of the return bent portions is crushed or bent against the contiguous portion. The combined radial thicknesses of the crushed return bent portion and the contiguous portion are such that the piston and oil ring assembly has a diameter at the overlapping portion that is greater than the bore diameter so that the piston and oil ring assembly cannot be inserted within the bore.

Therefore, an object of this invention is to provide a spacer-expander whose ends are self-aligning during insertion of the piston and oil ring assembly into a cylinder bore.

Another object is to provide a spacer-expander that indicates when the ends of the spacer-expander are overlapped by preventing insertion of the piston and oil ring assembly into a cylinder bore.

Still further objects are to improve known spacer-expanders by a simple structural change in the end portions, requiring only minimum production changes and, additionally, to provide, by only slight modification, a spacer-expander having self-locking ends.

In the drawings FIG. 1 is a top view of a spacer-expander made in accordance with the present invention, including a fragmentary showing of a rail used therewith.

FIG. 2 is an enlarged perspective showing abutting end portions of the spacer-expander.

FIG. 3 is a fragmentary view showing end portions of ribbon stock for the spacer-expander of FIG. 1.

FIGS. 4, 5 and 6 illustrate various orientations of the spacer-expander ends which can occur during insertion of a piston and oil ring assembly within a cylinder bore.

FIG. 7 is a perspective showing a modification of the spacer-expander of FIG. 1 to provide properly aligned locking of the ends.

FIG. 8 is a fragmentary view showing end portions of ribbon stock for the spacer-expander of FIG. 7.

FIG. 9 is an enlarged view showing the end portions of the spacer-expander of FIG. 7 in locked interengagement.

FIG. 10 is a view taken along lines 10—10 of FIG. 4 showing the piston and oil ring assembly positioned within a cylinder bore.

For purposes of illustration the parted spacer-expander is basically of the type disclosed in the previously mentioned patent to Olson, except that the end portions have been modified in accordance with the present invention. Oil ring 11 includes spacer-expander 12 and rails 24. Spacer-expander 12 comprises a parted ring 14 having a consecutive series of alternating inward and outward corrugations, the corrugations being formed by inner crowns 16 and outer crowns 18, connected by upper and lower legs 17 which are separated by slots 19. Spacer-expander 12 may be formed from a strip of flat metal ribbon stock as shown in FIG. 3. Inner lips 20 extend from the upper and lower edges of inner crowns 16. Similarly outer lips 21 project from the upper and lower edges of outer crowns 18 but to a lesser extent than the inner lips 20. The modified end portions of the instant invention are indicated generally at 22.

Oil ring 11 includes two parted rails 24 (FIG. 10), the spaced apart ends of which define a gap 25 therebetween (FIG. 1). As shown in FIG. 10, rails 24 are carried on opposite, upper and lower, edges of the spacer-expander 12, and seat on the outer lips 21. The inner edges 23 of the rails 24 are engaged by inner lips 20. As more fully explained in the aforementioned patent, after the oil ring 11 has been circumferentially compressed, and the piston and oil ring assembly inserted within cylinder bore 26, lips 20 of the spacer-expander urge the rails 24 radially outward to maintain the outer edges 35 of rails 24 in contact with bore 26. With oil ring 11 retained in oil ring groove 40 of piston 39 in this manner and, assuming the oil ring is centered in the oil ring groove, there is a radial clearance or spacing 44 between the bottom 42 of groove 40 and the oil ring 11. The usual clearance exists between the outer surface 43 of piston 39 and the bore 26.

As best illustrated in FIG. 2, the ends of the spacer-expander 12 comprise elbows 28, 30 formed by return bent portions 32, 34 and the contiguous inner crowns 36, 38, respectively. Preferably the acute included angle between each return bent portion 32, 34 and the contiguous inner crown 36, 38 is within the range of from 35 to 40 degrees.

In installation the oil ring 11 is first slipped over piston 39 into the oil ring groove 40. Then to insert the piston and oil ring assembly within the cylinder bore 26, the rails 24 are circumferentially compressed or contracted to close gap 25 (FIG. 1) and thus reduce the diameter of the oil ring to a dimension equal to or slightly less than the bore of the cylinder. Compression of the rails places the spacer-expander 12 in circumferential compression. If at the beginning of this compression step the ends of the spacer-expander are not properly aligned as illustrated by the overlapping elbow 30' shown in broken lines in FIG. 4, elbow 30' will be cammed radially inward down the inclined end portion 32 into the properly aligned position shown in full lines. FIGS. 4 and 10 show the piston and oil ring assembly inserted within the bore 26 with the oil ring 11 compressed. In FIG. 4 the oil ring is shown centered with respect to the groove 40 on the piston which results in the spacing 44 previously referred to. In FIG. 6 the piston is shown shifted to the left in the cylinder bore a maximum extent so that the radial dimension between the bottom of groove 40 and the bore of the cylinder is the maximum value adjacent the overlapped ends of the spacer-expander. In this position of the piston the maximum spacing that would be present between the bottom of groove 40 and a properly arranged spacer-expander is indicated by broken lines at 45 in FIG. 6. In prior art devices the spacing 44 and particularly the maximum spacing 45 was sufficient to accommodate overlapped and nested, spacer-expander ends and permitted the piston and oil ring assembly to be inserted within the bore. With the instant invention, however, if the ends are overlapped as shown in FIG. 5 return bent portion 32 lies between the inner crowns 36, 38. Therefore, when the rails are compressed return bent portion 32 will be crushed to lie flat against inner crown 36 in the most extreme situation as shown in FIG. 6. The combined radial thicknesses of the return bent portion 32 and its contiguous inner crown 36 exceed the maximum available spacing 45 so that the diameter of the piston and oil ring assembly at the point of overlap is greater than the bore diameter. The rails cannot be contracted sufficiently to permit insertion of the piston and oil ring assembly within the bore. In other words, when the ends are overlapped there are three thicknesses of ribbon stock, i.e., two inner crowns 36, 38 and one return bent portion 32, between the inner edges 23 of the rails 24 and the bottom 42 of the oil ring groove 40; whereas in prior art devices when nesting occurred there were only two thicknesses of ribbon stock, i.e., two inner crowns corresponding to inner crowns 36, 38. Two thicknesses of ribbon stock will fit within the maximum spacing between the rails and the bottom of the groove when the oil ring is not centered, but three thicknesses will not.

As shown in FIGS. 7–9, the spacer-expander ends may include a locking arrangement comprising notches 46, 48 cut in the elbows 28, 30, respectively, and extending into the inner crowns 36, 38 and into the return bent portions 32, 34. The unnotched portions of the elbows 28, 30 form projections 50, 52, respectively, adapted to register and interfit with complementary notches. More particularly, the projection 50, for example, registers with notch 48 of elbow 30 and is held against radial displacement by edges 54, 56 when the spacer-expander is circumferentially compressed.

While the invention is particularly adapted to prevent nesting of overlapped inner corrugations in the corrugated spacer-expander particularly disclosed, it should be understood that the return bent end portions can be used on other types of spacer-expanders to minimize overlap, as well as indicate when overlapping occurs.

I claim:
1. A spacer-expander for supporting, spacing and outwardly urging generally flat, parted rails in a piston oil ring comprising a parted ring of the self-supporting type, said parted ring having ends that abut when said spacer-expander and said rails are disposed in an oil ring groove and said spacer-expander is in its operative circumferentially-compressed condition, each of said ends being provided with a return bent portion, each return bent portion forming an acute included angle with the contiguous portion of said parted ring.
2. A spacer-expander as set forth in claim 1 wherein each of said return bent portions extends radially outward from said contiguous portion.
3. A spacer-expander as set forth in claim 1 wherein each included angle is within the range of from 35 to 40 degrees.
4. A spacer-expander as set forth in claim 1 wherein said ends include means for locking said ends in radial alignment.
5. A spacer-expander as set forth in claim 1 wherein each return bent portion and the contiguous portion form an elbow, said elbows being formed with notches and projections adapted to interfit with one another to lock said ends in radial alignment.
6. A spacer-expander as set forth in claim 1 wherein said ring comprises a continuous corrugated strip of resilient material.
7. A spacer-expander for supporting, spacing, and outwardly urging generally flat, parted rails in a piston oil ring assembly, said spacer-expander comprising a parted ring of the self-supporting type, said parted ring having ends that abut when said spacer-expander and said rails are disposed in an oil ring groove and said spacer-expander is in its operative circumferentially-compressed condition, said parted ring being formed from a continuous strip of corrugated material, said corrugations comprising alternating radially inner and outer crowns interconnected by legs, the corrugation at each end of said spacer-expander having a terminal leg and a contiguous inner crown, and each of said terminal legs being return bent at an acute angle to its contiguous inner crown.
8. A spacer-expander as set forth in claim 7 wherein each return bent portion and the contiguous inner crown form an elbow, said elbows being formed with notches and projections adapted to interfit with one another to lock said ends in radial alignment.
9. In a piston and oil ring assembly adapted for insertion within the bore of a piston cylinder, an oil ring groove in said piston retaining said oil ring, said oil ring comprising flat, parted, circular rails and a spacer-expander for supporting and spacing said rails and for urging said rails outwardly against the bore of said cylinder, said spacer-expander comprising a parted ring of the self-supporting type, said parted ring having ends that abut when said spacer-expander and said rails are disposed in an oil ring groove and said spacer-expander is in its operative circumferentially-compressed condition, each of said ends being provided with a return bent portion, each return bent portion forming an acute included angle with the contiguous portion of said parted ring, the radially innermost edge portion of said oil ring having a predetermined maximum spacing from the bottom of said oil ring groove when said piston and oil ring assembly is inserted within said bore, the combined thicknesses of a return bent portion and a contiguous portion being greater than said predetermined maximum spacing whereby if said ends of said spacer-expander are inadvertently overlapped, the combined thicknesses of a return bent portion and a contiguous portion prevents contraction of said rails radially sufficiently to permit insertion of the piston and oil ring assembly within said cylinder bore.
10. In a piston and oil ring assembly adapted for insertion within the bore of a piston cylinder, an oil ring groove in said piston retaining said oil ring, said oil ring comprising flat, parted, circular rails and a spacer-expander for supporting and spacing said rails and for urging said rails outwardly against the bore of said cylinder, said spacer-expander comprising a parted ring of the self-supporting type, said parted ring having ends that abut when said spacer-expander and said rails are disposed in an oil ring groove and said spacer-expander is in its operative circumferentially-compressed condition, each of said ends being provided with a return bent portion, each return bent portion forming an acute included angle with the contiguous portion of said parted ring, the bottom of said oil groove having a predetermined maximum spacing from said bore when said piston and oil ring assembly is inserted within said bore, and said predetermined maximum spacing being insufficient to accommodate said oil ring when said spacer-expander ends are overlapped.

11. In a piston and oil ring assembly adapted for insertion within the bore of a piston cylinder, an oil ring groove in said piston retaining said oil ring, said oil ring comprising flat, parted, circular rails and a spacer-expander for supporting and spacing said rails and for urging said rails outwardly against the bore of said cylinder, said spacer-expander comprising a parted ring of the self-supporting type, said parted ring having ends that abut when said spacer-expander and said rails are disposed in an oil ring groove and said spacer-expander is in its operative circumferentially-compressed condition, each of said ends being provided with a return bent portion, each return bent portion forming an acute included angle with the contiguous portion of said parted ring, the bottom of said oil groove having a predetermined maximum spacing from said bore when said piston and oil ring assembly is inserted within said bore, and the combined thicknesses of two contiguous portions and one return bent portion plus the rail width being greater than said predetermined maximum spacing whereby if said spacer-expander ends are overlapped the piston oil ring assembly has a diameter through the overlap that is greater than the diameter of the bore.

12. The combination as set forth in claim 11 wherein said spacer-expander is formed from a strip of resilient material and three thicknesses of said strip plus the width of said rail are greater than said predetermined maximum spacing.

13. The combination as set forth in claim 12 wherein said strip is radially corrugated.

14. A spacer-expander for supporting, spacing and outwardly urging generally flat, parted rails in a piston oil ring comprising a parted ring of the self-supporting type, said parted ring having ends that abut when said spacer-expander and said rails are disposed in an oil ring groove and said spacer-expander is in its operative circumferentially-compressed condition, each of said ends being provided with a return bent portion, each return bent portion forming an acute included angle with a radius of said parted ring.

15. A spacer-expander for use in a piston oil ring assembly of the type adapted to be retained in an oil ring groove of a piston when the piston is disposed in a cylinder bore with a predetermined maximum spacing between the oil ring assembly and the bottom of the oil ring groove, said spacer-expander comprising a parted ring of the self-supporting type, said parted ring having ends that abut when said spacer-expander and said rails are disposed in an oil ring groove and said spacer-expander is in its operative circumferentially-compressed condition, each of said ends being provided with a return bent portion forming an acute included angle with the contiguous portion of said ring, and the combined thicknesses of a return bent portion and a contiguous portion being greater than said predetermined maximum spacing whereby if said ends of said spacer-expander are inadvertently overlapped, the combined thicknesses of a return bent portion and a contiguous portion prevents contraction of said rails radially sufficiently to permit insertion of the piston and oil ring assembly within said cylinder bore.

16. In combination a piston, an oil ring assembly, and an engine cylinder, said piston having an oil ring groove, said oil ring assembly being retained in said groove, said piston with said oil ring assembly being inserted within said cylinder, said oil ring assembly comprising flat circular parted rails supported by a spacer-expander urging said rails outwardly against the wall of said cylinder, said spacer-expander comprising a parted ring having each of its ends provided with a return bent portion, each return bent portion forming an acute included angle with the contiguous portion of said parted ring, the radially innermost edge portion of said oil ring having a predetermined maximum spacing from the bottom of the oil ring groove when said rails abut the wall of said bore, and the combined thicknesses of a return bent portion and a contiguous portion being greater than said predetermined maximum spacing whereby the combined thicknesses of a return bent portion and a contiguous portion prevent contractions of said rails radially sufficiently to permit insertion of the piston with the oil ring assembled thereon within said cylinder when the ends of said spacer-expander are overlapped.

17. A spacer-expander of the self-supporting type for supporting, spacing, and outwardly urging generally flat, parted rails in a piston oil ring assembly, said spacer-expander comprising a parted ring formed with radial corrugations comprising an alternating series of inner and outer crowns with alternate crowns connected by generally radial legs, one end corrugation of said spacer-expander having an end portion that abuts an end portion on the other end corrugation when said ring is in an operative circumferentially compressed condition, said one end corrugation having a radial leg remote from said abutting portion, said inner crowns defining the inner periphery of said spacer-expander, the outer crowns defining the outer periphery of said spacer-expander, a zone of potential overlap on said one end corrugation defined radially between said inner and outer periphery of said spacer-expander and defined circumferentially between said remote radial leg and said abutting portion, and means for resisting nesting of said end corrugations at said overlap zone projecting into said overlap zone and spaced radially from the crown of said one end corrugation and spaced circumferentially from said remote radial leg of said one end corrugation less than the circumferential dimension of the crown of said other end corrugation whereby if said end corrugations are overlapped, nesting of said end corrugations is resisted so that said piston oil ring assembly has a diameter through the overlapped corrugations that is greater than the diameter of an engine cylinder into which the piston oil ring assembly is to be inserted to thereby indicate that said end corrugations are overlapped.

18. The spacer-expander set forth in claim 17 wherein said one end corrugation is a radially inward corrugation having an inner crown and said projecting means extends in a direction radially outward from said last mentioned inner crown.

19. The spacer-expander set forth in claim 17 wherein said projecting means terminates within said zone.

20. The spacer-expander set forth in claim 17 wherein said one end corrugation has a return bent tab forming an elbow, said abutting portion comprising the bend of said elbow, and said projecting means comprising the free end of said return bent tab.

21. In a piston and oil ring assembly adapted for insertion into an engine cylinder, an oil ring groove in said piston retaining said oil ring, said oil ring comprising flat, parted circular rails and a spacer-expander for supporting and spacing said rails and for urging said rails outwardly against the wall of said cylinder, said spacer-expander comprising a parted ring formed with radial corrugations comprising an alternating series of inner and outer crowns with alternate crowns connected by generally radial legs, one end corrugation of said spacer-expander having an end portion that abuts an end portion on the other end corrugation when said ring is in an operative circumferentially compressed condition, said one end corrugation having a radial leg remote from said abutting portion, said inner crowns defining the inner periphery of said spacer-expander, the outer crowns defining the outer periphery of said spacer-expander, a zone of potential overlap on said one end corrugation defined radially between said inner and outer periphery of said spacer-expander and defined circumferentially between said remote radial leg and said abutting portion, an abutment on said one end corrugation projecting into said overlap zone so as to be spaced radially from the crown of said one end corrugation and spaced circumferentially from said remote radial leg of said one end corrugation less than the circumferential dimension of the crown of said other end corrugation, the radially innermost portion of said oil ring having a predetermined maximum spacing from the bottom of the oil ring groove when said rails abut the wall of said cylinder, the radial dimension of the radial space between said projection and said inner periphery of said spacer-expander being greater than said predetermined maximum spacing, whereby if said end corrugations are overlapped, the crown on the other end corrugation engages the abutment on said one end corrugation so that the piston and oil ring assembly has a diameter through the overlap that is greater than the diameter of said cylinder and said abutment restrains contraction of said rails radially sufficiently to permit insertion of the piston and oil ring assembly into said cylinder.

References Cited by the Examiner

UNITED STATES PATENTS

| | | | |
|---|---|---|---|
| 326,046 | 9/85 | Love | 277—147 |
| 2,059,179 | 10/36 | Smith | 267—1.5 |
| 2,112,425 | 3/38 | Nixon | 267—1.5 |
| 2,466,252 | 4/49 | McFall | 277—148 |
| 2,789,872 | 4/57 | Olson | 277—139 |
| 2,917,353 | 12/59 | Baumler et al. | 277—139 |

EDWARD V. BENHAM, *Primary Examiner.*

SAMUEL ROTHBERG, *Examiner.*

UNITED STATES PATENT OFFICE
CERTIFICATE OF CORRECTION

Patent No. 3,166,331                        January 19, 1965

Frank G. Warrick

It is hereby certified that error appears in the above numbered patent requiring correction and that the said Letters Patent should read as corrected below.

Column 5, line 38, before "oil" insert -- and --.

Signed and sealed this 1st day of June 1965.

(SEAL)
Attest:

ERNEST W. SWIDER
Attesting Officer

EDWARD J. BRENNER
Commissioner of Patents